(12) United States Patent
Weitzel

(10) Patent No.: US 6,890,975 B2
(45) Date of Patent: May 10, 2005

(54) WATER-REDISPERSIBLE POLYMER POWDERS FOR BUILDING ADHESIVE COMPOSITIONS

(75) Inventor: Hans-Peter Weitzel, Reischach (DE)

(73) Assignee: Wacker Polymer Systems GmbH & Co. KG, Burghausen (DE)

(*) Notice: Subject to any disclaimer, the term of this patent is extended or adjusted under 35 U.S.C. 154(b) by 0 days.

(21) Appl. No.: 09/805,510

(22) Filed: Mar. 13, 2001

(65) Prior Publication Data

US 2003/0032711 A1 Feb. 13, 2003

(30) Foreign Application Priority Data

Apr. 20, 2000 (DE) .......................................... 100 19 598

(51) Int. Cl.$^7$ ................................................. C08K 3/00
(52) U.S. Cl. ............................... 524/4; 524/5; 524/459; 524/503
(58) Field of Search ................................ 524/459, 503, 524/4, 5

(56) References Cited

U.S. PATENT DOCUMENTS

| | | | | |
|---|---|---|---|---|
| 2,733,995 A | * | 2/1956 | Robinson | 524/5 |
| 3,126,355 A | * | 3/1964 | Birten et al. | 524/21 |
| 3,256,221 A | * | 6/1966 | Cooper | 524/44 |
| 3,287,290 A | * | 11/1966 | Bray, Jr. | 524/46 |
| 3,409,578 A | * | 11/1968 | Hwa | 524/398 |
| 3,692,713 A | * | 9/1972 | Columbus et al. | 524/47 |
| 3,784,648 A | * | 1/1974 | Bergmeister et al. | 523/332 |
| 5,498,665 A | * | 3/1996 | Schulze et al. | 525/57 |
| 5,608,011 A | * | 3/1997 | Eck et al. | 525/344 |
| 5,932,647 A | * | 8/1999 | Schilling et al. | 524/503 |
| 6,331,587 B1 | * | 12/2001 | Geissler | 524/459 |

FOREIGN PATENT DOCUMENTS

| | | |
|---|---|---|
| DE | 2 148 456 | 4/1973 |
| EP | 0 035 332 | 9/1981 |
| EP | 0 103 253 A2 | 9/1983 |
| EP | 0 640 630 | 3/1995 |
| EP | 1 069 169 A1 | 6/2000 |
| GB | 1 407 827 | 9/1975 |
| JP | 409176602 A * | 7/1997 |

OTHER PUBLICATIONS

Fox T.G., Bull. Am. Physics Soc. 1, 3 page 123 (1956).
Polymer Handbook, 2$^{nd}$ Ed., J. Wiley & Sons, New York (1975).
Derwent Abstract Corresponding To EP–A 0103253 [AN 1984–069886 [12] ].
Derwent Abstract Corresponding To EP–A 1069169 [AN 2001–184295 [19] ].
Patent Abstracts of Japan, vol. 018, No. 371 (C–1224) of Jul. 13, 1994 Corresponding To JP–A 06100344.

* cited by examiner

*Primary Examiner*—Bernard Lipman
(74) *Attorney, Agent, or Firm*—Brooks Kushman P.C.

(57) ABSTRACT

A water-redispersible polymer powder based on protective colloid stabilized vinyl ester polymers for use in building adhesive compositions is provided. The vinyl ester polymers contain from 0.2 to 1.5% by weight, based on the overall weight of the vinyl ester polymers, or auxiliary monomer units derived from monomers having a higher water solubility than vinyl acetate.

21 Claims, No Drawings

– 1 –
WATER-REDISPERSIBLE POLYMER POWDERS FOR BUILDING ADHESIVE COMPOSITIONS

FIELD OF THE INVENTION

The invention relates to the use of water-redispersible polymer powders based on protective colloid stabilized vinyl ester polymers in building adhesive compositions.

BACKGROUND OF THE INVENTION

Polymers stabilized by protective colloids are used in particular in the form of their aqueous dispersions or water-redispersible polymer powders in diverse applications, as coating compositions or adhesives, for example, for a very wide variety of substrates: for example, as cementitious tile adhesives. The protective colloids used are generally polyvinyl alcohols. The use of polyvinyl alcohol is worthwhile because, in comparison to systems stabilized by low molecular mass compounds, such as emulsifiers, polyvinyl alcohol makes its own contribution to strength (e.g., tensile adhesion values in the tile adhesive). Monomers used to prepare redispersible powders have to date been preferably vinyl esters and ethylene. When the vinyl ester/ethylene combination is used, the establishment of stability with respect to saponification necessitates a high ethylene content, which reduces the Tg. This may have adverse effects on the tensile bond strength of the tile adhesives, especially after storage under hot conditions. What is desirable, however, is a high and constant level of the tensile bond strengths in the tile adhesive after storage under any conditions (dry, wet, heat and freeze/thaw).

Especially when polymers are used in the form of their redispersion powders to improve the properties of mortar, a major field of use for redispersion powders, the formulations are required to remain stable for a certain time and must not suffer any substantial alteration in their processing consistency (viscosity stability or cement stability); indeed, a user cannot be expected to have to stir up a new mixture within a short time span. In the concrete and mortar industry, furthermore, an important part is played by the mechanical properties, such as the compressive strength, the porosity and thus the air pore content. If there are too many air pores, the compressive strength falls sharply; if there are too few, or no, air pores in the mortar or concrete, the building material will lack sufficient freeze/thaw stability.

DE-A 21 48 456 (GB-A 14 07 827) discloses building adhesives based on copolymers containing hydroxyl-containing silicon compounds in copolymerized form. EP-B 35332 describes tile adhesives based on styrene-acrylate copolymers, containing not only hydroxyl-containing silicon compounds but also relatively large amounts—up to 10% by weight—of copolymerized (meth)acrylic acid units. In EP-A 640630, it is recommended, for the purpose of preparing tile adhesives, to use silicon-modified polymer dispersions containing up to 4% by weight of ethylenically unsaturated carboxamides in copolymerized form.

It is an object of the invention to provide stable, low-viscosity, protective colloid stabilized dispersion powders based on vinyl ester polymers which, when used in cementitious applications, possess a completely satisfactory viscosity stability or cement stability and which do not hinder the setting of the cement. A further object is to provide redispersible powders which have better and more consistent tensile bond strengths after storage under any conditions.

BRIEF DESCRIPTION OF THE INVENTION

Normally, the use of hydrophobic monomers is preferred in order to obtain water-resistant products. It has surprisingly now been found that better tensile bond strengths, even after storage under wet and freeze/thaw conditions, are observed when hydrophilic water-soluble monomers are used.

The invention provides for the use of water-redispersible polymer powders based on protective colloid stabilized vinyl ester polymers in building adhesive compositions, wherein the vinyl ester polymers contain from 0.2 to 1.5% by weight, based on the overall weight of the vinyl ester polymers, of auxiliary monomer units derived from monomers having a higher water solubility than vinyl acetate, the solubility of vinyl acetate in water being approximately 2 g per 100 g of water under standard conditions.

DETAILED DESCRIPTION OF THE INVENTION

Suitable auxiliary monomers are ethylenically unsaturated monocarboxylic and dicarboxylic acids and their anhydrides, preferably acrylic acid, methacrylic acid, itaconic acid, crotonic acid, fumaric acid and maleic acid, and maleic anhydride; ethylenically unsaturated carboxamides and carbonitriles, preferably acrylamide, methacrylamide, acrylamidoglycolic acid and acrylonitrile; ethylenically unsaturated sulfonic acids and their salts, preferably vinylsulfonic acid and 2-acrylamido-2-methylpropanesulfonic acid. The amount of auxiliary monomer is preferably 0.5 to 1.0% by weight, based on the overall weight of the vinyl ester polymers.

Suitable vinyl esters are one or more monomers from the group of the vinyl esters of branched or unbranched carboxylic acids having 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 11 carbon atoms, an example being VeoVa9$^R$ or VeoVa10$^R$ (trade names of Shell). Vinyl acetate is particularly preferred.

If desired, the vinyl ester polymers may also contain further comonomers from the group of the esters of acrylic acid or methacrylic acid with branched or unbranched alcohols having 1 to 15 carbon atoms, from the group of the olefins, of the vinyl halides and of the monoesters and diesters of ethylenically unsaturated dicarboxylic acids. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Methyl acrylate, methyl meth-acrylate, n-butyl acrylate, 2-ethylhexyl acrylate and norbornyl acrylate are particularly preferred. Examples of copolymerizable olefins are ethene and propene. From the group of the vinyl halides, it is common to use vinyl chloride. Suitable monoesters and diesters of ethylenically unsaturated dicarboxylic acids are the monoesters and diesters of fumaric acid and maleic acid, such as their diethyl and diisopropyl esters.

If desired, from 0.05 to 10% by weight, based on the overall weight of the monomer mixture, of further functional comonomers may be copolymerized. Examples thereof are precrosslinking comonomers such as polyethylenically unsaturated comonomers, examples being divinyl adipate, diallyl maleate, allyl methacrylate and triallyl cyanurate, or post-crosslinking comonomers, examples being methylacryl-amidoglycolic methyl ester (MAGME), N-methylol-acrylamide (NMA), N-methylolmethacrylamide, N-methylol-allylcarbamate, alkyl ethers such as the isobutoxy ether or esters of N-methylolacrylamide, of N-methyl-olmethacrylamide and of N-methylolallylcarbamate. Further examples are silicon-functional comonomers, such as acryloxypropyltri(alkoxy) silanes and methacryl-oxypropyltri(alkoxy)silanes, vinyltrialkoxysilanes and vinylmethyldialkoxysilanes, examples of alkoxy groups that may be present being ethoxy and ethoxypropylene glycol ether radicals. Further examples are comonomers containing epoxide groups, such as glycidyl acrylate, glycidyl methacrylate, allyl glycidyl ether, vinyl glycidyl ether, and vinylcyclohexene oxide.

Greatest preference is given to the base polymers specified below, which also contain the water-soluble auxiliary monomers and any functional comonomer units, in the amounts just described. With the fraction of auxiliary monomers and any functional comonomer units, the amounts in % by weight add up to 100% by weight in each case.

Vinyl ester-ethylene copolymers, such as vinyl acetate-ethylene copolymers, having an ethylene content of preferably from 1 to 60% by weight, further comprising, if desired, fumaric or maleic diesters, preferably their diethyl and diisopropyl esters;

vinyl ester-ethylene-vinyl chloride copolymers having an ethylene content of preferably from 1 to 40% by weight and a vinyl chloride content of preferably from 20 to 90% by weight, vinyl esters present comprising preferably vinyl acetate and/or vinyl propionate and/or one or more copolymerizable vinyl esters such as vinyl laurate, vinyl pivalate, vinyl 2-ethylhexanoate, vinyl esters of an alpha-branched carboxylic acid, especially Versatic acid vinyl esters (VeoVa9$^R$, VeoVa10$^R$);

vinyl acetate copolymers with preferably from 1 to 50% by weight of one or more copolymerizable vinyl esters such as vinyl laurate, vinyl pivalate, vinyl 2-ethylhexanoate, vinyl esters of an alpha-branched carboxylic acid, especially Versatic acid vinyl esters (VeoVa9$^R$, VeoVa10$^R$), further comprising, if desired, from 1 to 40% by weight of ethylene;

vinyl ester-acrylic ester copolymers containing preferably from 30 to 90% by weight of vinyl ester, especially vinyl acetate, and preferably from 1 to 60% by weight of acrylic ester, especially n-butyl acrylate or 2-ethylhexyl acrylate, and further comprising, if desired, from 1 to 40% by weight of ethylene;

vinyl ester-acrylic ester copolymers containing preferably from 30 to 75% by weight of vinyl acetate, preferably from 1 to 30% by weight of vinyl laurate or vinyl esters of an alpha-branched carboxylic acid, especially Versatic acid vinyl esters, preferably from 1 to 30% by weight of acrylic esters, especially n-butyl acrylate or 2-ethylhexyl acrylate, and further comprising, if desired, from 1 to 40% by weight of ethylene.

The monomer selection and the selection of the weight fractions of the comonomers are made so that in general the resulting glass transition temperature, Tg, is from −50° C. to +50° C., preferably from −30° C. to +40° C. The glass transition temperature, Tg, of the polymers can be determined in a known manner by means of differential scanning calorimetry (DSC). The Tg can also be calculated approximately in advance using the Fox equation. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ represents the mass fraction (% by weight/100) of the monomer n and $Tg_n$ is the glass transition temperature, in kelvins, of the homopolymer of the monomer n. Tg values for homopolymers are listed in the Polymer Handbook, 2nd Edition, J. Wiley & Sons, New York (1975).

Preparation takes place by the emulsion polymerization process or by the suspension polymerization process, preferably by the emulsion polymerization process, the polymerization temperature being generally from 40° C. to 100° C., preferably from 60° C. to 90° C. Where gaseous comonomers such as ethylene or vinyl chloride are copolymerized it is also possible to operate under pressure, generally between 5 bar and 100 bar.

The polymerization is initiated with the water-soluble or monomer-soluble initiators, or redox initiator combinations, that are customary for emulsion polymerization or suspension polymerization, respectively. Examples of water-soluble initiators are the sodium, potassium and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, and dibenzoyl peroxide. Said initiators are used generally in an amount of from 0.01 to 0.5% by weight, based on the overall weight of the monomers.

Redox initiators used are combinations of said initiators with reducing agents. Suitable reducing agents are the sulfites and bisulfites of alkali metals and of ammonium, an example being sodium sulfite, the derivatives of sulfoxylic acid, such as zinc or alkali metal formaldehyde sulfoxylates, for example, sodium hydroxymethanesulfinate, and ascorbic acid. The amount of reducing agent is preferably from 0.01 to 0.5% by weight, based on the overall weight of the monomers.

In order to control the molecular weight it is possible to use regulating substances during the polymerization. If regulators are used, it is normally in amounts of from 0.01 to 5.0% by weight, based on the monomers to be polymerized, and they are metered in separately or else as a premix with reaction components. Examples of such substances are n-dodecyl mercaptan, tert-dodecyl mercaptan, mercaptopropionic acid, methyl mercapto propionate, isopropanol, and acetaldehyde. Preferably, no regulating substances are used.

Suitable protective colloids are partially or fully hydrolyzed polyvinyl alcohols. Preference is given to partially hydrolyzed polyvinyl alcohols having a degree of hydrolysis of from 80 to 95 mol % and a Höppler viscosity in 4% strength aqueous solution of from 1 to 30 mPas (method according to Höppler at 20° C., DIN 53015). Also suitable are partially hydrolyzed, hydrophobically modified polyvinyl alcohols having a degree of hydrolysis of from 80 to 95 mol % and a Höppler viscosity in 4% strength aqueous solution of from 1 to 30 mPas. Examples thereof are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 carbon atoms, dialkyl maleates and dialkyl fumarates such as diisopropyl maleate and diisopropyl fumarate, vinyl chloride, vinyl alkyl ethers such as vinyl butyl ether, and olefins such as ethene and decene. The fraction of the hydrophobic units is preferably from 0.1 to 10% by weight, based on the overall weight of the partially hydrolyzed polyvinyl alcohol. It is also possible to use mixtures of said polyvinyl alcohols.

Further suitable polyvinyl alcohols are partially hydrolyzed, hydrophobicized polyvinyl alcohols obtained by polymer-analogous reaction, an example being acetalization of the vinyl alcohol units with $C_1$ to $C_4$ aldehydes such as butyraldehyde. The fraction of the hydrophobic units is preferably from 0.1 to 10% by weight, based on the overall weight of the partially hydrolyzed polyvinyl acetate. The degree of hydrolysis is from 80 to 95 mol %, preferably from 85 to 94 mol %, and the Höppler viscosity (DIN 53015, method according to Höppler, 4% strength aqueous solution) is from 1 to 30 mPas, preferably from 2 to 25 mPas.

Maximum preference is given to polyvinyl alcohols having a degree of hydrolysis of from 85 to 94 mol % and a Höppler viscosity in 4% strength aqueous solution of from 3 to 15 mPas (method according to Höppler at 20° C., DIN 53015). Said protective colloids are obtainable by means of processes known to the skilled worker.

The polyvinyl alcohols are used in general in an amount of in total from 1 to 20% by weight, based on the overall weight of the monomers, in the polymerization. The protective colloid fraction can either be included completely in the initial charge or else included in part in the initial charge and in part metered in. Preferably, at least 5% by weight of the protective colloid are included in the initial charge; most preferably, all of the protective colloid fraction is included in the initial charge.

In the process of the invention, polymerization is conducted preferably without adding emulsifiers. In exceptional cases, it may be of advantage to use, in addition, small amounts of emulsifiers, if appropriate from 1 to 5% by weight based on the monomer amount. Suitable emulsifiers include anionic, cationic, and nonionic emulsifiers, examples being anionic surfactants, such as alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having from 8 to 40 ethylene oxide units.

The monomers can be metered in in their entirety or included in fractions in the initial charge with the remainder being metered in following the initiation of the polymerization. A preferred procedure is to include from 50 to 100% by weight, based on the overall weight of the monomers, in the initial charge and to meter in the remainder. Metered additions may be conducted separately (spatially and temporarily) or some or all of the components to be metered can be metered in pre-emulsified form. Depending on their chemical nature, the auxiliary monomers likewise may be included in their entirety in the initial charge, or may be metered in. Partial inclusion in the initial charge, and partial metering, are also possible. The degree of monomer conversion is controlled with the metered addition of initiator.

After the end of polymerization, the batch can be post-polymerized using known methods in order to remove residual monomers, by means, for example, of postpolymerization initiated by redox catalyst. Volatile residual monomers can also be removed by means of distillation, preferably under reduced pressure, and, if desired, with the passage of inert entraining gases such as air, nitrogen or steam through or over the batch.

The aqueous dispersions resulting from the polymerization have a solids content of from 30 to 75% by weight, preferably from 50 to 60% by weight. In order to prepare the water-redispersible polymer powders, the aqueous dispersions are admixed if desired with protective colloids as a spraying aid and then dried by means, for example, of fluidized bed drying, freeze drying, or spray drying. Preferably, the dispersions are spray-dried. Spray drying takes place in standard spray-drying units, it being possible for atomization to take place by means of one-fluid, two-fluid or multifluid nozzles or with a rotating disk. The exit temperature is generally chosen in the range from 45° C. to 120° C., preferably from 60° C. to 90° C., depending on the unit, on the Tg of the resin, and on the desired degree of drying.

In general, the spraying aid is used in a total amount of from 3 to 30% by weight, based on the polymeric constituents of the dispersion. In other words, the total amount of protective colloid prior to the drying operation should be from at least 3 to 30% by weight, based on the polymer fraction; it is preferred to use from 5 to 20% by weight based on the polymer fraction.

Suitable spraying aids are partially hydrolyzed polyvinyl alcohols; polyvinylpyrrolidones; polysaccharides in water-soluble form such as starches (amylose and amylopectin), celluloses and their carboxymethyl, methyl, hydroxyethyl, and hydroxypropyl derivatives; proteins such as casein or caseinate, soya protein, gelatin; ligninsulfonates, synthetic polymers such as poly(meth)acrylic acid, copolymers of (meth)acrylates with carboxyl-functional comonomer units, poly(meth)acrylamide, polyvinylsulfonic acids and their water-soluble copolymers; melamine formaldehyde sulfonates, naphthalene-formaldehyde sulfonates, and styrene-maleic acid and vinyl ether-maleic acid copolymers. Preferably, no protective colloids other than polyvinyl alcohols are used as spraying aids.

At the spraying stage it has in many cases been found advantageous to include up to 1.5% by weight of antifoam, based on the base polymer. In order to extend the storage life by improving the blocking stability, especially in the case of powders having a low glass transition temperature, the powder obtained can be provided with an antiblocking (anticaking) agent, preferably up to 30% by weight, based on the overall weight of polymeric constituents. Examples of antiblocking agents are Ca or Mg carbonate, talc, gypsum, silica, kaolins, and silicates having particle sizes preferably in the range from 10 nm to 10 $\mu$m.

The viscosity of the feed to be sprayed is adjusted by way of the solids content so as to give a value of <500 mPas (Brookfield viscosity at 20 revolutions and 23° C.), preferably <250 mPas. The solids content of the dispersion to be sprayed is >35%, preferably >40%.

In order to improve the performance properties, further additives can be added at the spraying stage. Examples of further constituents of dispersion powder compositions, present in preferred embodiments, are pigments, fillers, foam stabilizers, and hydrophobicizers.

To produce the building adhesive, the polymer powder is mixed with the further formulation constituents such as cement, filler and other adjuvants in appropriate mixers, and homogenized. If desired, the dispersion powder composition may also be added in the form of an aqueous redispersion on the construction site (2-component adhesive). Preferably, a dry mix is prepared and the water required for processing is added immediately prior to processing. When preparing pastelike building adhesives, the water fraction is introduced first of all, the dispersion is added, and finally the solids are incorporated by stirring.

Typical cementitious building adhesive formulations contain from 5 to 80% by weight of cement, from 5 to 80% by weight of fillers such as quartz sand, calcium carbonate or talc, from 0.1 to 2% by weight of thickeners such as cellulose ethers, phyllosilicates, polyacrylates, from 0.5 to 60% by weight of the protective colloid stabilized polymer powders, and, if desired, further additives for improving stability, processability, open time, and water resistance. The amounts in % by weight always refer to 100% by weight dry mass of the formulation. The cementitious building adhesive formulations mentioned are employed in particular for the laying of tiles of all kinds (earthenware, stoneware, including fine stoneware, ceramic, natural material tiles) both inside and outside, as tile adhesives, and before being used are prepared by stirring together with the appropriate amount of water.

The protective colloid stabilized polymer powders are also suitable for use in cement-free building adhesive formulations: for example, with the corresponding amount of gypsum instead of cement as inorganic binder in the above-mentioned formulation. The cement-free building adhesive formulations are employed in particular for the laying of tiles of all kinds (earthenware, stoneware, including fine stoneware, ceramic, natural material tiles) in the interior sector as tile adhesives and as exterior insulation system adhesives for bonding polystyrene panels to facades.

The Examples Below Serve to Illustrate the Invention:

EXAMPLES

Emulsion polymerization was used to prepare polymer dispersions having a polymer composition of vinyl acetate-:ethylene of 100:7 parts by weight. The dispersions were stabilized using 8% by weight, based on vinyl acetate, of a polyvinyl alcohol having a degree of hydrolysis of 88 mol % and a Höppler viscosity of 4 mPas. The amount and nature of the auxiliary monomers used (% by weight based on vinyl acetate) are reproduced in table 1.

Powder Preparation

The dispersions from the examples were admixed with 5% by weight (solids/solids) of polyvinyl alcohol having a degree of hydrolysis of 88 mol % and a Höppler viscosity of 4 mPas and were diluted with water to a spray viscosity of 250 mPas. The dispersion was then sprayed using a two-fluid nozzle. The spraying component used was air precompressed to 4 bar, and the droplets formed were dried cocurrently with air heated to 125° C. The dry powder obtained was admixed with 10% by weight, based on the copolymer, of commercial antiblocking agent (mixture of calcium magnesium carbonate and magnesium hydrosilicate).

Performance Testing

Redispersion Behavior of the Polymer Films (R)

0.2 mm thick films of the dispersions of the above examples (before spray drying) were produced on glass plates and were dried at 105° C. for 15 minutes. To examine the film redispersibility, one drop of water was applied to a homogeneous site of the test film using a pipette at room temperature, and after leaving it to act for 60 seconds the water drop was rubbed at the same site using the fingertip until the glass plate at this site was film-free, the film fragmented, or the film retained its integrity completely.

The redispersibility of the polymer films was assessed using the following evaluation scheme:

rating 1: film can be redispersed immediately by slight rubbing or redisperses automatically;

rating 2: film can be redispersed by rubbing, film fragments of low redispersibility possible;

rating 3: film can be redispersed only by vigorous rubbing, and film fragments are formed;

rating 4: film cannot be redispersed even by prolonged vigorous rubbing, but instead fragments.

Determination of the Blocking Resistance (B)

To determine the blocking resistance, the dispersion powder was placed in an iron tube with a thread and then subjected to the load of a metal ram. Loading was followed by storage at 50° C. for 16 hours in a drying cabinet. After cooling to room temperature, the powder was removed from the tube and the blocking stability was determined qualitatively by crushing the powder.

The blocking stability was classified as follows:

1=very good blocking stability

2=good blocking stability

3=satisfactory blocking stability

4=not stable to blocking, powder after crushing no longer free-flowing

Determination of the Cement Stability (CS)

A cement mixture was prepared by stirring to the following formulation:

| Portland cement | | 82.5 g |
|---|---|---|
| Calcite (CaCO$_3$) | 10–40 µm | 75 g |
| Quartz sand | 200–500 µm | 142 g |
| Dispersion powder | | 14.5 g |
| Water | | 85 g |

The processability of the cement mixture was observed over a period of 2 hours and assessed qualitatively.

Determination of the Tensile Bond Strength

The tensile bond strengths in the tile adhesive were examined in the following formulation (6% by weight polymer powder fraction):

| Quartz sand | 586 parts |
|---|---|
| Portland cement | 350 parts |
| Cellulose | 4 parts |
| Dispersion powder | 60 parts |
| Water | 240 parts |

To test the tensile bond strength, the tile adhesives were applied to concrete slabs using a 5 mm toothed spatula. Subsequently, stoneware tiles measuring 5×5 cm$^2$ were placed on and weighted down for 30 seconds with a weight of 2 kg. Thereafter, the tiles were subjected to the following conditions in accordance with DIN CEN 1897:

28T: 28 days of dry storage under standard conditions (DIN 50014, 23° C., 50% atmospheric humidity)

7T/21N: 7 days of dry storage under standard conditions, 21 days of wet storage in water at 20° C.

14T/14T70° C./1T: 14 days of standard conditions, 14 days at 70° C. in a drying oven, 1 day of standard conditions Freeze/thaw: 7 days of dry storage under standard conditions, 21 days of wet storage in water at 20° C., 25 freeze/thaw cycles (frost storage at −15° C., water storage at 12° C.)

The tensile bond strength was determined in accordance with DIN 18156, following storage, using a peel instrument from the company Herion with a rate of load increase of 250 N/s. The measurements in N/mm² represent averages of 5 measurements.

The results of testing are summarized in tables 1 and 2.

strengths is obtained, and is maintained under all storage conditions. This improvement, however, occurs only within a narrow window, i.e., within a range from 0.5 to 1.0% by weight.

TABLE 1

| Example | Auxiliary monomer | Amount % by weight | SC % by weight | pH | BF20 mPas | MFT °C. | Dw | R | B | CS |
|---|---|---|---|---|---|---|---|---|---|---|
| C.Ex. A | none | 0 | 55.0 | 4.1 | 400 | 5 | 950 | 1 | 1 | yes |
| Ex. 1 | AA | 0.2 | 54.4 | 4.4 | 405 | 5 | 1097 | 1 | 1 | yes |
| Ex. 2 | AA | 1.5 | 55.4 | 4.0 | 472 | 5 | 1134 | 1 | 1 | yes |
| C.Ex. 3 | AA | 2.0 | 52.1 | 3.9 | 276 | 5 | 1180 | 1 | 1 | yes |
| Ex. 4 | Aa | 0.2 | 55.0 | 4.2 | 450 | 6.5 | 1097 | 1 | 1 | yes |
| Ex. 5 | Aa | 1.5 | 55.0 | 4.2 | 428 | 5 | 1097 | 1 | 1 | yes |
| C.Ex. 6 | Aa | 2.0 | 52.7 | 4.2 | 371 | 6 | 1090 | 1 | 1 | yes |
| C.Ex. 7 | Aa | 3.0 | 55.0 | 3.5 | 680 | 5 | 1160 | 1 | 1 | yes |
| Ex. 8 | AMPS | 0.2 | 55.0 | 4.4 | 590 | 6 | 984 | 1 | 1 | yes |
| Ex. 9 | AMPS | 1.5 | 55.1 | 4 | 560 | 5 | 1097 | 1 | 1 | yes |
| C.Ex. 10 | AMPS | 2.0 | 54.6 | 4.2 | 815 | 6 | 1650 | 1 | 1 | yes |
| C.Ex. 11 | AMPS | 3.0 | 55.2 | 4.1 | 630 | 6 | 1820 | 1 | 1 | yes |
| Ex. 12 | VS | 0.2 | 54.8 | 4.4 | 428 | 6.5 | 1204 | 1 | 1 | yes |
| Ex. 13 | VS | 1.5 | 55.4 | 4.4 | 500 | 5 | 1050 | 1 | 1 | yes |
| C.Ex. 14 | VS | 2.0 | 52.6 | 4.3 | 395 | 8 | 1020 | 1 | 1 | yes |
| Ex. 15 | MAn | 0.2 | 53.9 | 4.3 | 363 | 7 | 1322 | 1 | 1 | yes |
| Ex. 16 | MAn | 1.5 | 54.8 | 3.7 | 457 | 6 | 1322 | 1 | 1 | yes |
| Ex. 17 | AAGa | 1.5 | 55.0 | 3.8 | 750 | 5 | 1150 | 1 | 1 | yes |
| C.Ex. 18 | AAGa | 2.0 | 52.8 | 4 | 310 | 6 | 1110 | 1 | 1 | yes |
| Ex. 19 | Ia | 0.2 | 55.4 | 4.5 | 640 | 5 | 1120 | 1 | 1 | yes |
| Ex. 20 | Ia | 1.5 | 52.4 | 4.5 | 346 | 3 | 1160 | 1 | 1 | yes |
| C.Ex. 21 | Ia | 2.0 | 51.6 | 4.9 | 295 | 7 | 1120 | 1 | 1 | yes |

The abbreviations have the following meanings:

Auxiliary Monomers

AA=acrylamide,
Aa=acrylic acid,
AMPS=2-acrylamido-2-methylpropanesulfonic acid,
VS=vinylsulfonic acid,
MAn=maleic anhydride.
AAGa=acrylamidoglycolic acid
IA=itaconic acid
Amount=fraction of the auxiliary monomer in % by weight
SC=solids content of the polymer dispersion in % by weight
pH=pH of the polymer dispersion
BF20=Brookfield viscosity in mPas
MFT=minimum film-formation temperature of the polymer dispersion in ° C.
Dw=average particle size (weight average)
R=redispersion behavior
B=blocking resistance
CS=cement stability
(1)=tensile bond strength in N/mm² after 28T storage
(2)=tensile bond strength in N/mm² after 7T/21N storage
(3)=tensile bond strength in N/mm² after 14T/14T70° C./1T storage
(4)=tensile bond strength in N/mm² after freeze/thaw storage
Total (1–4)=total of the tensile bond strengths in N/mm²

The results in table 1 show that, even with modification of the vinyl ester polymers with auxiliary monomer units, powders having very good redispersion behavior and cement stability are obtained which exhibit good blocking stability and storage stability.

Table 2 shows that, with the modification with auxiliary monomer units, a distinct improvement in the tensile bond

TABLE 2

| Example | Auxiliary monomer | Amount | (1) | (2) | (3) | (4) |
|---|---|---|---|---|---|---|
| C.Ex. A | none | 0 | 1.67 | 0.72 | 1.64 | 0.62 |
| Ex. 1 | AA | 0.2 | 2.06 | 0.9 | 1.91 | 0.88 |
| Ex. 2 | AA | 1.5 | 1.95 | 1.11 | 2.31 | 0.95 |
| C.Ex. 3 | AA | 2.0 | 1.67 | 0.6 | 1.21 | 0.59 |
| Ex. 4 | Aa | 0.2 | 1.94 | 0.86 | 2.38 | 0.89 |
| Ex. 5 | Aa | 1.5 | 1.74 | 0.85 | 1.94 | 0.92 |
| C.Ex. 6 | Aa | 2.0 | 1.64 | 0.8 | 1.74 | 0.85 |
| C.Ex. 7 | Aa | 3.0 | 1.61 | 0.55 | 2.04 | 0.44 |
| Ex. 8 | AMPS | 0.2 | 2.06 | 0.9 | 1.94 | 0.63 |
| Ex. 9 | AMPS | 1.5 | 1.76 | 1.12 | 1.62 | 1.03 |
| C.Ex. 10 | AMPS | 2.0 | 1.65 | 0.95 | 1.55 | 0.8 |
| C.Ex. 11 | AMPS | 3.0 | 1.47 | 0.67 | 1.53 | 0.7 |
| Ex. 12 | VS | 0.2 | 2.12 | 1.1 | 2.11 | 0.95 |
| Ex. 13 | VS | 1.5 | 2.28 | 1.05 | 2.26 | 1.05 |
| C.Ex. 14 | VS | 2.0 | 1.69 | 0.57 | 1.81 | 0.58 |
| Ex. 15 | Man | 0.2 | 2.13 | 0.86 | 2.28 | 0.87 |
| Ex. 16 | Man | 1.5 | 2.11 | 0.9 | 2.11 | 0.83 |
| Ex. 17 | AAGa | 1.5 | 1.53 | 0.58 | 2.17 | 0.61 |
| C.Ex. 18 | AAGa | 2.0 | 1.46 | 0.64 | 1.6 | 0.57 |
| Ex. 19 | Ia | 0.2 | 1.6 | 0.58 | 2.26 | 0.62 |
| Ex. 20 | Ia | 1.5 | 1.38 | 0.55 | 1.77 | 0.71 |
| C.Ex. 21 | Ia | 2.0 | 1.38 | 0.53 | 1.31 | 0.57 |

What is claimed is:

1. In a hydraulically settable inorganic binder-based construction adhesive which is cementitious or cement-free, in which an aqueous polymer dispersion or redispersible polymer powder is added, the improvement comprising adding as at least a portion of said aqueous polymer dispersion or redispersible polymer powder, a polymer prepared by emulsion polymerization in the presence of a protective colloid, said polymer prepared from monomers comprising at least one vinyl ester monomer and from 0.2 to 1.5 weight percent, based on the total weight of all monomers, of an auxiliary monomer having a water solubility higher than vinyl acetate, wherein said cementitious construction adhesives comprises from 5 to 80 weight percent cement, from 5 to 80 weight percent of filler, and from 0.5 to 60 weight percent protective colloid stabilized polymer solids wherein said protective colloid is a partially hydrolyzed polyvinyl alcohol having a degree of hydrolysis less than or equal to 95 mol percent, and wherein said weight percents of cement, filler, and protective colloid stabilized polymer solids are based on the total weight of said construction adhesive.

2. The construction adhesive of claim 1 wherein said auxiliary monomer is present in an amount of from 0.5 to 1.0 weight percent.

3. The construction adhesive of claim 1 wherein said auxiliary monomer is at least one selected from the group consisting of ethylenically unsaturated monocarboxylic acids, ethylenically unsaturated dicarboxylic acids and anhydrides thereof, ethylenically unsaturated carboxamides, ethylenically unsaturated carbonitriles, ethylenically unsaturated sulfonic acids, and salts of the acid monomers of this group.

4. The construction adhesive of claim 1, wherein said auxiliary monomer is at least one selected from the group consisting of acrylic acid, acrylamide, 2-acrylamido-2-methylpropane sulfonic acid, vinylsulfonic acid, maleic anhydride, acrylamidoglycolic acid, and itaconic acid.

5. The construction adhesive of claim 1, wherein said monomers further comprise at least one monomer or monomer mixture selected from the group consisting of ethylene, ethylene and fumaric acid, ethylene and maleic acid diesters, ethylene and vinyl chloride, acrylic acid esters, and ethylene and acrylic acid esters.

6. The construction adhesive of claim 1, wherein said at least one vinyl ester monomer comprises vinyl acetate.

7. The construction adhesive of claim 1 wherein said at least one vinyl ester monomer comprises a mixture of vinyl acetate and a vinyl ester other than vinyl acetate.

8. The construction adhesive of claim 1 wherein said protective colloid comprises at least one polyvinyl alcohol selected from the group consisting of partially hydrolyzed polyvinyl alcohols having a degree of hydrolysis of from 80 to 95 mol % and a Höppler viscosity in a 4% by weight aqueous solution of from 1 to 30 mPas, and partially hydrolyzed, hydrophobically modified polyvinyl alcohols having a degree of hydrolysis of from 80 to 95 mol % and a Höppler viscosity in 4% by weight aqueous solution of from 1 to 30 mPas.

9. The construction adhesive of claim 1 wherein said polymer prepared by emulsion polymerization is prepared from monomers comprising vinyl acetate, ethylene, and from 0.5 to 1.0 weight percent of at least one auxiliary monomer.

10. The construction adhesive of claim 1, which is a cementitious adhesive.

11. The construction adhesive of claim 1 which is a cement-free adhesive.

12. The construction adhesive of claim 11 wherein said adhesive comprises gypsum as an inorganic binder.

13. The construction adhesive of claim 1 which is selected from the group consisting of exterior insulation system adhesives, tile adhesives, mortar, and concrete.

14. The construction adhesive of claim 1 wherein said polymer prepared by emulsion polymerization is in the form of a redispersible polymer powder.

15. The construction adhesive of claim 14 which is in the form of a dry mix.

16. A process for improving the tensile strength of a set cementitious or cement-free, inorganic binder-based construction adhesive, the improvement comprising incorporating into a settable cementitious or cement free construction adhesive a protective colloid stabilized aqueous polymer dispersion or redispersible polymer powder prepared therefrom, the polymer of said aqueous polymer dispersion prepared by copolymerizing monomers comprising a vinyl ester monomer, and from 0.2 to 1.5 weight percent based on the weight of all monomers of at least one auxiliary monomer having a water solubility greater than vinyl acetate.

17. The process of claim 16 wherein said monomers comprise vinyl acetate, ethylene, and at least one auxiliary monomer in an amount of from 0.5 to 1.0 weight percent.

18. The process of claim 16 wherein the at least one auxiliary monomer is selected from the group consisting of acrylic acid, acrylamide, 2-acrylamido-2-methylpropane sulfonic acid, vinylsulfonic acid, maleic anhydride, acrylamidoglycolic acid, and itaconic acid.

19. The construction adhesive of claim 1 which is an exterior insulation system adhesive.

20. The construction adhesive of claim 1, wherein said auxiliary monomer having a water solubility greater than vinyl acetate is selected from the group consisting of acrylamide, 2-acrylamido-2methylpropanesulfonic acid, vinylsulfonic acid, acrylamidoglycolic acid, and maleic anhydride.

21. The construction adhesive of claim 20, wherein said auxiliary monomer having a water solubility greater than vinyl acetate is present in an amount of from 0.5 to 1.0 percent by weight, based on the weight of said vinyl ester polymer.

* * * * *